(12) United States Patent
Kondoh et al.

(10) Patent No.: US 8,401,310 B2
(45) Date of Patent: Mar. 19, 2013

(54) IMAGE COMPARING METHOD, APPARATUS AND PROGRAM

(75) Inventors: Katsuhiko Kondoh, Tokyo (JP); Daisuke Nishiwaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1070 days.

(21) Appl. No.: 12/333,817

(22) Filed: Dec. 12, 2008

(65) Prior Publication Data

US 2009/0154767 A1  Jun. 18, 2009

(30) Foreign Application Priority Data

Dec. 17, 2007 (JP) .................................. 324211/2007

(51) Int. Cl.
*G06K 9/68* (2006.01)
(52) U.S. Cl. ........................................................ 382/218
(58) Field of Classification Search .................. 382/100, 382/101, 181, 190, 209, 218
See application file for complete search history.

(56) References Cited

U.S. PATENT DOCUMENTS

2006/0056733 A1 * 3/2006 Minakuti et al. .............. 382/286

FOREIGN PATENT DOCUMENTS

| JP | 59-36299 A | 2/1984 |
|---|---|---|
| JP | 61-241885 A | 10/1986 |
| JP | 3-52640 B | 8/1991 |
| JP | 4-260988 A | 9/1992 |
| JP | 5-77080 A | 10/1993 |
| JP | 6-64478 B | 8/1994 |
| JP | 6-348903 A | 12/1994 |
| JP | 2000011088 A | 1/2000 |
| JP | 3264242 B | 12/2001 |
| JP | 2002368529 A | 12/2002 |
| JP | 2003099776 A | 4/2003 |
| JP | 3475886 B | 9/2003 |
| JP | 2003256466 A | 9/2003 |
| JP | 3496559 B2 | 11/2003 |
| JP | 3535292 B | 3/2004 |
| JP | 3550681 B2 | 5/2004 |
| JP | 2005284731 A | 10/2005 |
| JP | 2006228255 A | 8/2006 |
| JP | 2007094689 A | 4/2007 |
| JP | 3951707 B | 5/2007 |
| WO | 0229720 A1 | 4/2002 |

OTHER PUBLICATIONS

M. Ikeda et al., "Projection Distance Method for Recognition of Hand-written Characters", Transactions of Information Processing Society of Japan, Information Processing Society of Japan, vol. 24. No. 1, Jan. 15, 1983, pp. 106-112.
Japanese Office Action for JP2007-324211 issued Dec. 8, 2009.
Japanese Office Action for JP2007-324211 issued Feb. 23, 2009.
Tomohiro Nakai et al., "Fast Camera-Based Document Image Retrieval Using Local Arrangements of Feature Points", IEICE Transactions on Information and Systems, J89-D, No. 9, (2006), pp. 2045-2054.

* cited by examiner

*Primary Examiner* — Daniel Mariam

(57) ABSTRACT

Disclosed is an image comparing method for comparing plural first images and a second image, includes: converting the second image to generate a second numerical data; dividing each of plural first numerical data corresponding to the plural first images into plural parts, and dividing the second numerical data into plural parts; comparing a first part of the divided parts of the plural first numerical data and a first part of the divided parts of the second numerical data; outputting a first result, when the first part of the divided parts of the plural first numerical data satisfies a first condition; and comparing a second part of the divided parts of the plural first numerical data and a second part of the divided parts of the second numerical data, when the first part of the divided parts of the plural first numerical data satisfies a second condition.

23 Claims, 11 Drawing Sheets

Fig.5

| INDEX (ID) | FEATURE | | | | | | | |
|---|---|---|---|---|---|---|---|---|
| | FEATURE 1 | 2 | ... | j | j+1 | ... | ... | J |
| 1 | | | | | | | | |
| 2 | | | | | | | | |
| 3 | | | | | | | | |
| : | | | | | | | | |
| M | | | | | | | | |

IMAGE COMPARING METHOD, APPARATUS AND PROGRAM

This application is based upon and claims the benefit of priority from Japanese Patent Application No. 2007-324211, filed on Dec. 17, 2007, the disclosure of which is incorporated herein in its entirety by reference.

TECHNICAL FIELD

The present invention relates to an image comparing method, an image comparing apparatus and an image comparing program.

BACKGROUND ART

Conventionally, in a postal mail classification system or a physical distribution system, a barcode reading system is used as a system to sort mail articles or delivered articles. A barcode reading system reads a barcode printed on a mail or delivered article and acquires address data or delivery destination data from a read-out ID. Mail or delivered articles are sorted into sorting boxes each corresponding to an address in a delivery service area based on the data. Recently, use of an image reader, which substitutes for such a barcode reading system, is increasing. An image reader is used for acquiring numerical data from an image obtained by scanning a surface of a mail or delivered article to identify the mail or delivered article.

FIG. 10 shows a block diagram of an example of an image comparing apparatus 900 of the related art. This image comparing apparatus 900 includes an image input unit 901, a feature extraction unit 902, a feature storing unit 903, a comparing unit 904 and a comparison result output unit 905. The image input unit 901 scans a character or the like on a sheet to convert it into image data processible by a computer. The feature extraction unit 902 converts the image data obtained by the image input unit 901 into a numerical data. The feature storing unit 903 stores the numerical data obtained by the feature extraction unit 902 with an index, corresponding to the character or the like on the sheet. The comparing unit 904 compares the numerical data extracted from the image with plural numerical data, which are extracted from plural images registered in advance in the feature storing unit 903. The comparison result output unit 905 outputs the index, which is a comparison result by the comparing unit 904.

Next, processing of the image comparing apparatus 900 of FIG. 10 will be described with reference to the flowchart of FIG. 11. First, the image input unit 901 scans a surface of a sheet. Image data of a character, a symbol, an image, or the like on the sheet is obtained (Step S901). Next, the feature extraction unit 902 extracts a feature of the image data inputted from the image input unit 901 (Step S902). Extraction of the feature, specifically, is a conversion from an image data to a numerical data using, for example, information obtained from texture information of image or an adjacency relationship for connected components of image.

Next, it is selected whether the numerical data obtained from the image data is newly registered in the image comparing apparatus 900, or the numerical data is compared with numerical data stored in advance in the feature storing unit 903, (Step S903). The image comparing apparatus 900 may be realized by a personal computer or a workstation. The above mentioned two options may be shown on a display attached to such an apparatus, and selected by operation of a keyboard or a mouse.

When the option of registration is selected in Step S903, an index (ID) is newly generated (Step S904). The index may be selected discretionary, unless the same index has been registered in advance in the feature storing unit 903. Next, the numerical data extracted in Step S902 and the index generated in Step S904 (ID) are registered in the feature storing unit 903 (Step S905), and the processing ends.

On the other hand, when the option of comparison is selected in Step S903, the comparing unit 904 compares the numerical data extracted in Step S902 with the numerical data registered in advance in the feature storing unit 903 and similar to the extracted numerical data (Step S906). Then, it is examined whether there is a numerical data determined to be identical to the extracted numerical data in the plural numerical data stored in the feature storing unit 903 (Step S907).

When there is a numerical data determined to be identical in Step S907, an index (ID) given to the numerical data determined to be identical is outputted from the comparison result output unit 905 (Step S908), and the processing ends. On the other hand, when there is no numerical data determined to be identical, the comparison result output unit 905 outputs a result that there are no objects to be identified (Step S909), and the processing ends.

Japanese Patent Application Laid-Open No. 2000-011088 discloses an image comparing apparatus, which recognizes a character, comprising: a scanner for optically reading a surface of an address side of a mail article and converts a scanned image into image data of the mail; and a feature extraction unit which extracts image information such as a destination address and a zip code from the image data of the mail. In this image comparing apparatus, the feature extraction unit extracts four kinds of image feature information every 512 pixels included in one scanning line, and stores the information into a feature memory. Image feature information is a histogram showing a density frequency distribution of image, low-resolution multi value data, medium-resolution binary data and high-resolution binary data. As a result, a frame memory, which temporarily saves pixel gray data of the whole screen to be read, pixel gray data after a character region is clipped and pixel gray data after a line is clipped, becomes unnecessary.

Republication of PCT international application WO2002/029720 discloses an image comparing apparatus, which compares fingerprint images. A similarity between a part of feature information extracted from a fingerprint image of a registrant and a part corresponding to the registered fingerprint is calculated. A fingerprint image determined to be identical is narrowed down without extracting supplementary information. As a result, fingerprint comparing time is reduced. Identity is determined from the calculated similarity, and the registered fingerprints are narrowed down. By determining similarity between a fingerprint image of an person to be identified and the registered fingerprint which has been narrowed down according to the feature information, a fingerprint image to be performed identity determination is narrowed down.

SUMMARY

The object of the present invention is to provide an image comparing method, an image comparing apparatus and an image comparing program having a high comparing speed and high comparison accuracy.

An image comparing method for comparing plural first images and a second image according to an exemplary aspect of the invention, includes: converting the second image to generate a second numerical data; dividing each of plural first numerical data corresponding to the plural first images into plural parts, and dividing the second numerical data into plural parts; comparing a first part of the divided parts of the plural first numerical data and a first part of the divided parts of the second numerical data; outputting a first result, when the first part of the divided parts of the plural first numerical data satisfies a first condition; and comparing a second part of the divided parts of the plural first numerical data and a second part of the divided parts of the second numerical data, when the first part of the divided parts of the plural first numerical data satisfies a second condition.

An image comparing apparatus for comparing plural first images and a second image according to an exemplary aspect of the invention, includes: a generating unit to convert the second image to generate a second numerical data; a dividing unit to divide each of plural first numerical data corresponding to the plural first images into plural parts, and divide the second numerical data into plural parts; and a comparing unit to compare a first part of the divided parts of the plural first numerical data and a first part of the divided parts of the second numerical data. The comparing unit outputs a first result, when the first part of the divided parts of the plural first numerical data satisfies a first condition, and compares a second part of the divided parts of the plural first numerical data and a second part of the divided parts of the second numerical data, when the first part of the divided parts of the plural first numerical data satisfies a second condition.

A recording medium according to an exemplary aspect of the invention stores a program which makes a computer execute processing to compare plural first images and a second image. The processing includes: converting the second image to generate a second numerical data; dividing each of plural first numerical data corresponding to the plural first images into plural parts, and dividing the second numerical data into plural parts; comparing a first part of the divided parts of the plural first numerical data and a first part of the divided parts of the second numerical data; outputting a first result, when the first part of the divided parts of the plural first numerical data satisfies a first condition; and comparing a second part of the divided parts of the plural first numerical data and a second part of the divided parts of the second numerical data, when the first part of the divided parts of the plural first numerical data satisfies a second condition.

BRIEF DESCRIPTION OF THE DRAWINGS

Exemplary features and advantages of the present invention will become apparent from the following detailed description when taken with the accompanying drawings in which:

FIG. 5 shows an example of a storage form of numerical data in the second embodiment;

EXEMPLARY EMBODIMENT

Next, a detailed explanation will be given for a first exemplary embodiment with reference to the drawings.

(The First Embodiment)

Figure 1:
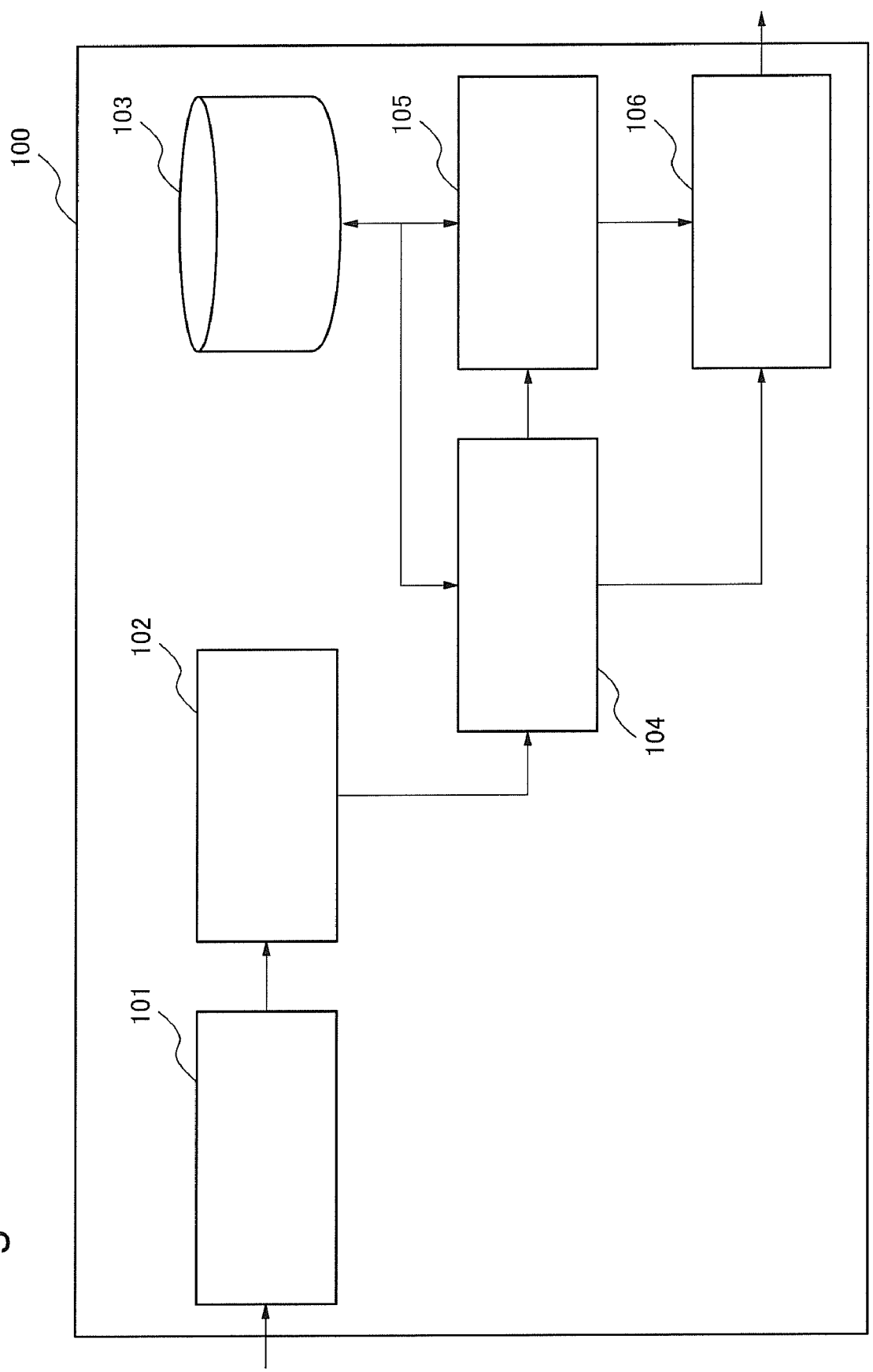
FIG. 1 shows an example of an image comparing apparatus in a first embodiment.

FIG. 1 shows an exemplary block diagram of an image comparing apparatus of the first embodiment.

As shown in FIG. 1, an image comparing apparatus 100 in the first embodiment includes an image input unit 101, a feature extraction unit 102, a feature storage unit 103, a first comparing unit 104, a second comparing unit 105 and a comparison result output unit 106. The image input unit 101 scans an image such as a character, a symbol or a figure indicated on a sheet, and converts the scanned image into image data processible by a computer. For example, the image includes a postal address. The feature extraction unit 102 converts the image data obtained by the image input unit 101 into a numerical data. The feature storage unit 103 stores the numerical data converted from the image data with an index.

The image on the sheet scanned by the image input unit 101 and converted into the numerical data by the feature extraction unit 102 is compared with numerical data stored in the feature storage unit 103 converted from the plural image data. Based on the numerical data obtained by scanning, the first comparing unit 104 selects numerical data corresponding to the image indicated on the sheet from the numerical data stored in the feature storage unit 103. Then, the first comparing unit 104 selects numerical data stored in the feature storage unit 103, which has the most similar part to a predetermined part of the numerical data obtained by the feature extraction unit 102. The first comparing unit 104 identifies an index corresponding to the selected numerical data. The second comparing unit 105 selects the most similar numerical data with reference to another part of the numerical data, which has not been used by the first comparing unit 104. The second comparing unit 105 identifies an index corresponding to the selected numerical data. The comparison result output unit 106 outputs the index selected from the first comparing unit 104 or the second comparing unit 105.

A scanner capable of photoelectric conversion may be adopted as the image input unit 101. The feature extraction unit 102, which converts image data into a numerical data, is realized, for example, by a personal computer or a workstation. Connection between the image input unit 101 and the feature extraction unit 102 is realized by a common transmission cable such as a USB cable, IEEE1394 cable or Ethernet® cable, or by wireless communication.

The first comparing unit 104 and the second comparing unit 105 compare the numerical data obtained from the input image with numerical data in the feature storage unit 103 for plural images. Comparing processing by the first comparing unit 104 and the second comparing unit 105 is realized, for example, by a personal computer or a workstation capable of calculating a similarity of numerical data.

The comparison result output unit 106 outputs the index corresponding to the numerical data with the largest similarity obtained by the comparison in the first comparing unit 104 and the second comparing unit 105. The comparison result output unit 106 is realized by an interface, which a personal computer or a workstation is equipped with, such as RS232-C. The index may be outputted via a network.

Figure 2:
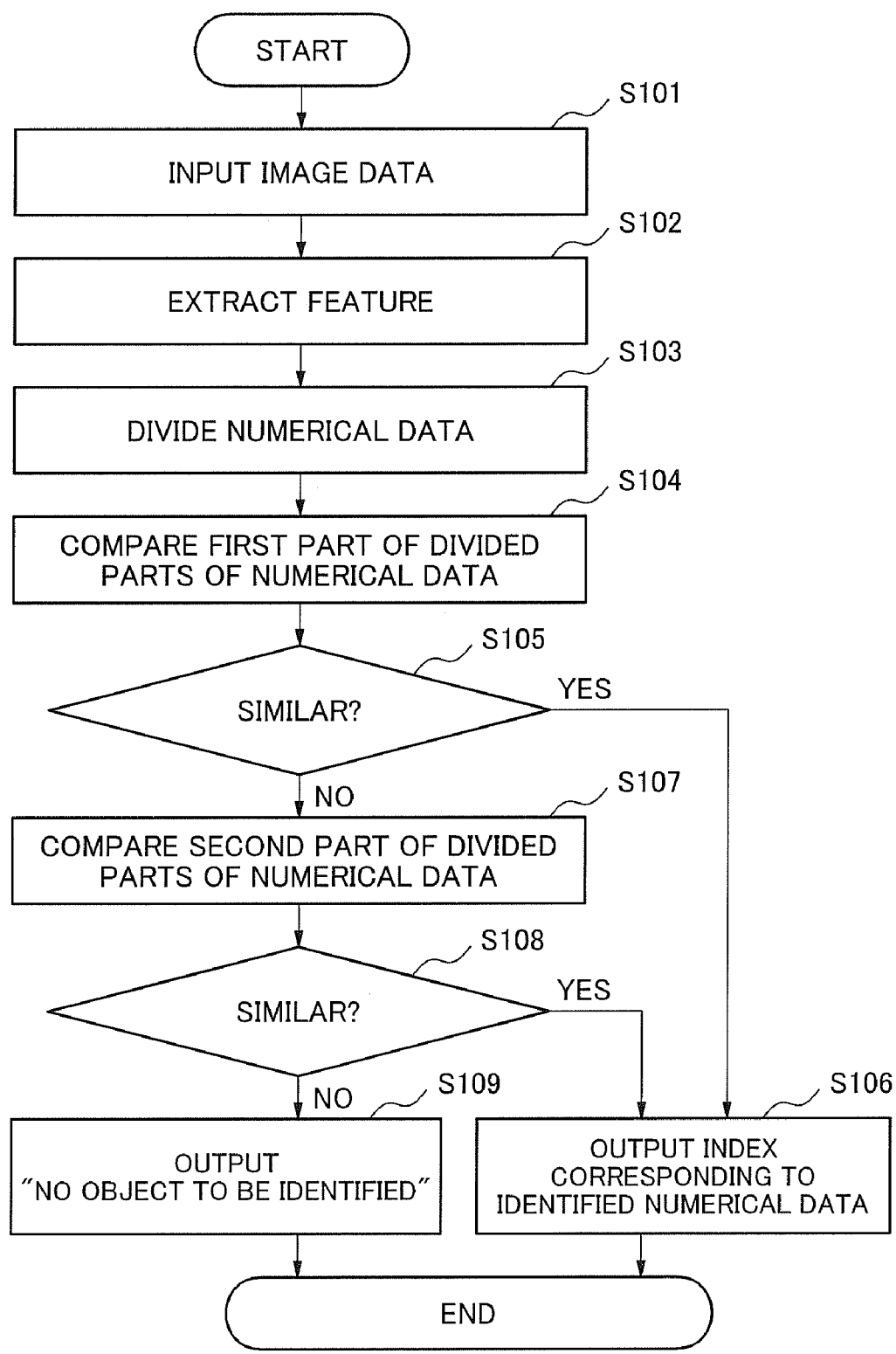
FIG. 2 is a flowchart showing an example of processing of the image comparing apparatus in the first embodiment.

FIG. 2 is a flowchart showing an example of processing of the image comparing apparatus of the first embodiment.

The image input unit 101 scans a surface of a sheet and obtains data of an image such as a character, a symbol or a figure indicated on a surface of the sheet (Step S101). Next, the feature extraction unit 102 extracts a feature from inputted image data (Step S102). Extraction of the feature, specifically, is a conversion from an image data to a numerical data, for example.

Next, using the numerical data extracted in Step S102, the first comparing unit 104 searches for a numerical data registered in advance in the feature storage unit 103 and similar to the extracted numerical data.

Before searching, the first comparing unit 104 divides the numerical data obtained by extracting from the input image in Step S102 into two parts (S103). The dividing position is discretionary.

Next, the first comparing unit 104 divides each of the plural numerical data stored in the feature storage unit 103 into two parts at the same dividing position as the numerical data obtained from the input image. For components of the same divided part of the numerical data stored in the feature storage unit 103, the first comparing unit 104 searches for numerical data having a component similar to the component of one of the parts (the first part) of the divided numerical data obtained from the input image (Step S104).

Next, the first comparing unit 104 examines whether there is a numerical data determined to be identical to the first numerical data in the plural numerical data stored in the feature storage unit 103 (Step S105). In Step S105, when there is a numerical data determined to be identical, the first comparing unit 104 identifies an index (ID) given to the numerical data determined to be identical. The comparison result output unit 106 outputs the identified index (ID) (Step S106).

On the other hand, in Step S105, when there is no numerical data determined to be identical to the numerical data obtained from the input image in the plural numerical data stored in the feature storage unit 103, the second comparing unit 105 performs comparison. The first comparing unit 104 notifies the second comparing unit 105 of the result that the feature storage unit 103 does not include a numerical data which is identical to the divided numerical data, and transmits the divided numerical data to the second comparing unit 105. The second comparing unit 105 performs the same comparison procedure as above for the component of the other part (the second part) of the numerical data, which has been divided into two parts (Step S107).

Next, the second comparing unit 105 examines whether there is a numerical data determined to be identical to the numerical data obtained from the input image in the plural numerical data stored in the feature storage unit 103 (Step S108). In Step S108, when there is a numerical data determined to be identical, the second comparing unit 105 identifies an index (ID) given to the numerical data determined to be identical. The comparison result output unit 106 outputs the identified index (ID) (Step S106).

Meanwhile, when there is no numerical data determined to be identical to the numerical data obtained from the input image in the plural stored numerical data in Step S108, the comparison result output unit 106 outputs the result that there are no objects to be identified (Step S109).

(The Second Embodiment)

Figure 3:
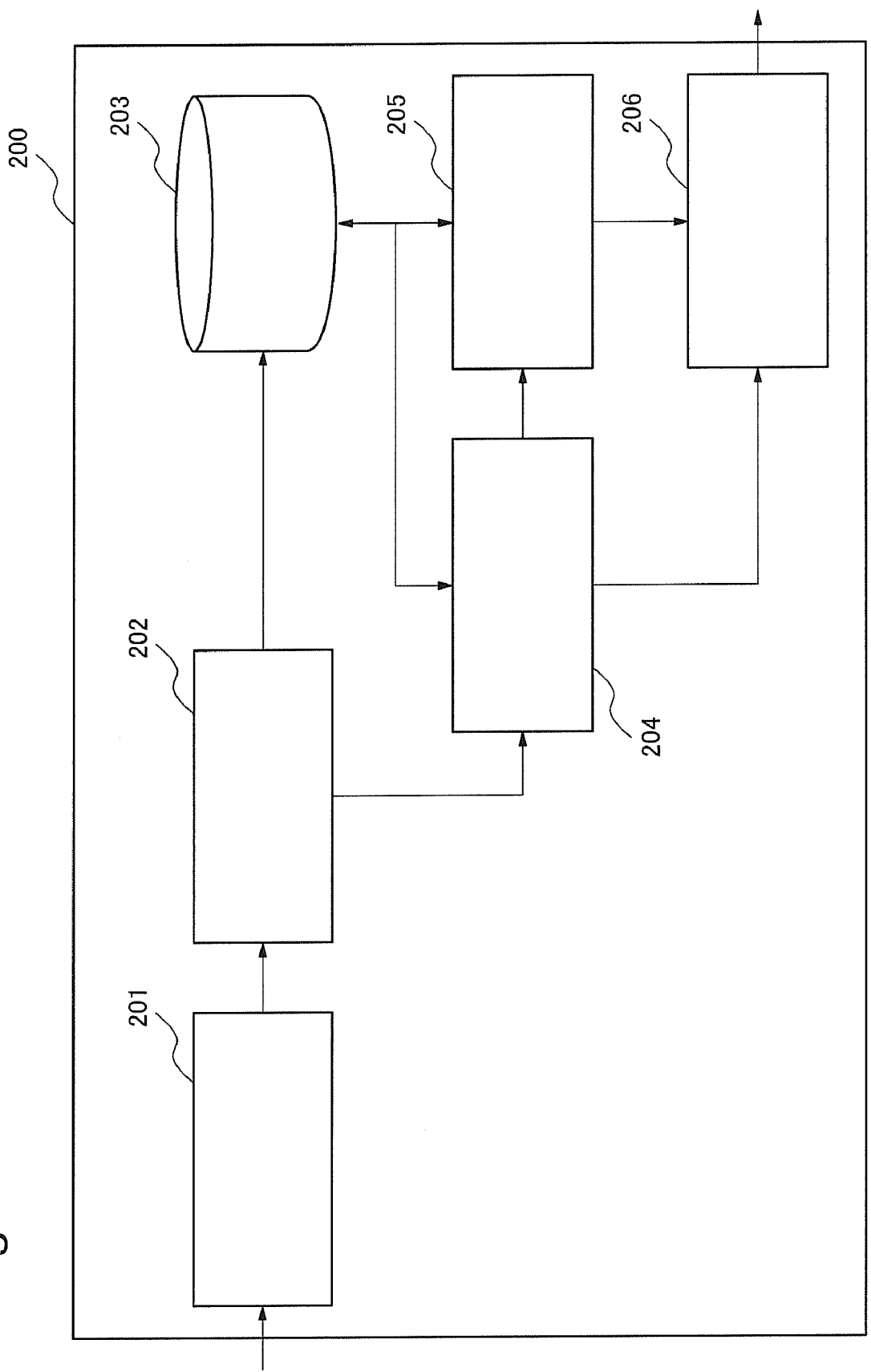
FIG. 3 indicates an example of an image comparing apparatus in a second embodiment.

FIG. 3 shows a block diagram of an image comparing apparatus of a second embodiment.

As shown in FIG. 3, an image comparing apparatus 200 according to the second embodiment includes an image input unit 201, a feature extraction unit 202, a feature storage unit 203, a first comparing unit 204, a second comparing unit 205 and a comparison result output unit 206. The image input unit 201 scans an image such as a character, a symbol or a figure indicated on a sheet, and converts it into image data processible by a computer. For example, the image includes a postal address. The feature extraction unit 202 converts the image data obtained by the image input unit 201 into a numerical data. The feature storage unit 203 stores the numerical data corresponding to the image obtained by the feature extraction unit 202 with an index. The feature storage unit 203 repeats the same processing as above and stores plural numerical data which has been converted from the image data, each having an index.

The image input unit 201 scans a surface of a sheet indicating a retrieval picture to obtain an image data. The obtained image data is converted by the feature extraction unit 202 into a numerical data. Based on the numerical data, the first comparing unit 204 selects numerical data corresponding to the retrieval picture indicated on the sheet from the plural numerical data stored in the feature storage unit 203. Then, the first comparing unit 204 selects a numerical data having a part most similar to a first predetermined part of the numerical data obtained from the inputted retrieval picture, from the plural numerical data stored in the feature storage unit 203. The first comparing unit 204 then identifies an index corresponding to the selected numerical data. When there is no numerical data having a similar part to the first predetermined part of the numerical data obtained from the inputted retrieval picture in the feature storage unit 203, the second comparing unit 205 selects numerical data. That is, the first comparing unit 204 notifies the second comparing unit 205 of a result that there is no similar numerical data, and transmits the numerical data obtained from the input image to the second comparing unit 205. The second comparing unit 205 selects numerical data most similar to the numerical data obtained from the input image, from the plural numerical data stored in the feature storage unit 203 using second partial numerical data other than the first predetermined part, which has been used by the first comparing unit 204. Then, the second comparing unit 205 identifies an index corresponding to the selected numerical data. The comparison result output unit 206 outputs the index identified by the first comparing unit 204 or the second comparing unit 205.

A scanner capable of photoelectric conversion may be adopted as the image input unit 201. The feature extraction unit 202, which converts image data into a numerical data is realized, for example, by a personal computer or a workstation. Connection between the image input unit 201 and the feature extraction unit 202 is realized, e.g. by a common transmission cable such as a USB cable, IEEE1394 cable or Ethernet® cable, or by wireless communication.

The feature storage unit 203 stores the numerical data, which the feature extraction unit 202 calculated. The feature storage unit 203 is realized by an external storage, which a system of a personal computer or a workstation is equipped with, such as a hard disk. The hard disk may be incorporated or installed externally.

The first comparing unit 204 and the second comparing unit 205 compare the numerical data obtained from the input image with the numerical data stored in the feature storage unit 203 corresponding to plural images. Comparing processing by the first comparing unit 204 and the second comparing unit 205 is realized, for example, by a personal computer or a workstation, which can calculate a similarity of numerical data.

The comparison result output unit 206 outputs the index corresponding to the numerical data with the largest similarity obtained by the comparison processing in the first comparing unit 204 and the second comparing unit 205. The comparison result output unit 206 is realized by an interface, which a personal computer or a workstation is equipped with, such as RS232-C. The index may be outputted via a network.

Figure 4:
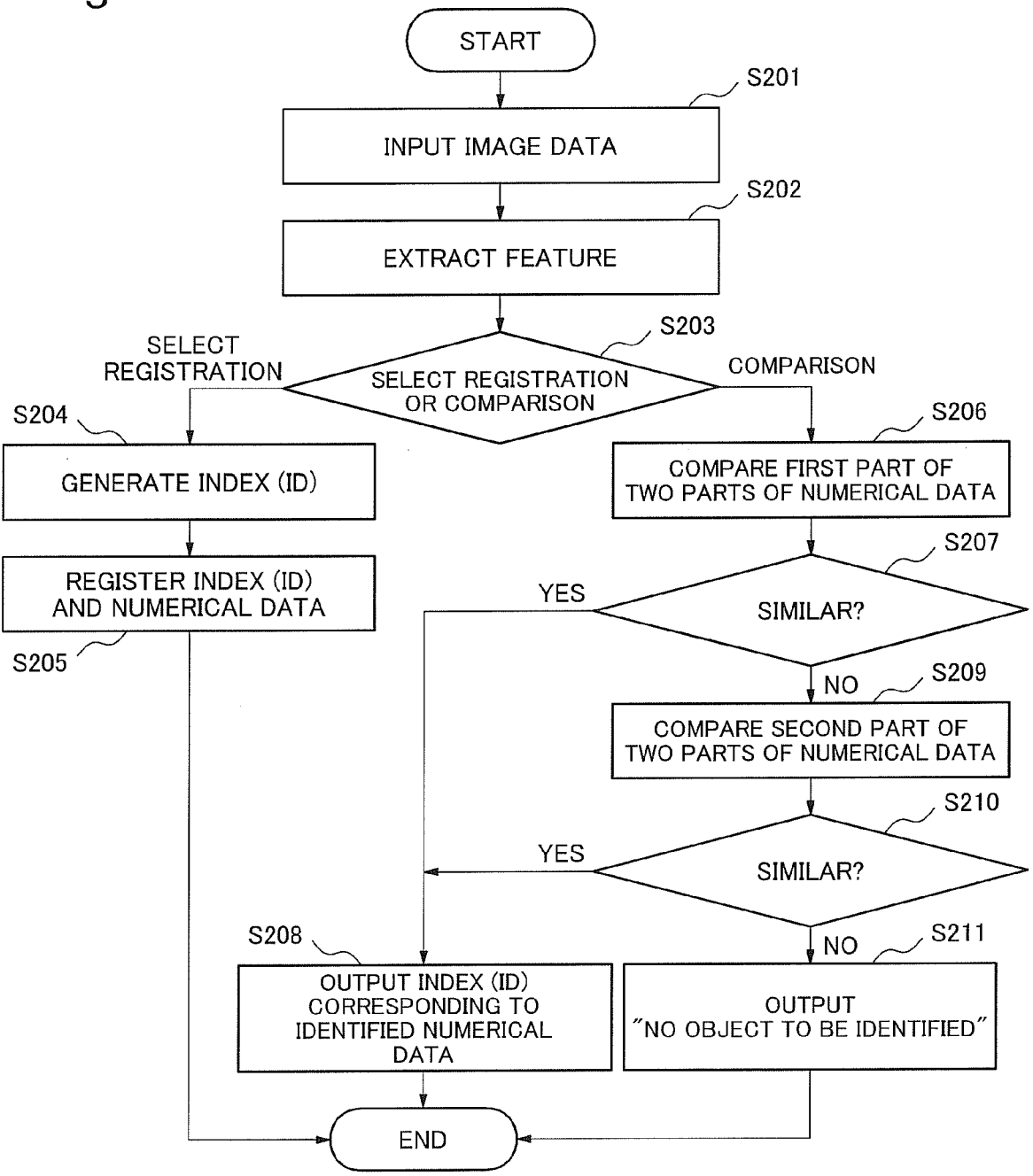
FIG. 4 is a flowchart showing an example of processing of the image comparing apparatus in the second embodiment.

Next, referring to the flowchart of FIG. 4, an example of processing of the second embodiment will be described. First, the image input unit 201 scans a surface of a sheet and obtains data of an image such as a character, a symbol or a figure indicated on a surface of the sheet (Step S201). For example, the image includes a postal address. Next, the feature extraction unit 202 extracts a feature from the inputted image data (Step S202). Specifically, extraction of the feature is a conversion from an image data to a numerical data, for example. The feature extraction unit 202 converts the image data into the numerical data using, for example, information obtained from texture information of image and an adjacency relationship for connected components of image. When converting into a numerical data using texture information, the methods described in Japanese Patent Publication No. 3496559 or Japanese Patent Publication No. 3550681 may be adopted. When converting into a numerical data using information obtained from an adjacency relationship for connected components of image, e.g. a publicly known method such as described in Tomohiro NAKAI et al., "Fast Camera-Based Document Image Retrieval Using Local Arrangements of Feature Points", IEICE TRANSACTIONS on Information and Systems, J89-D, No. 9, pp. 2045-2054 (2006) (hereinafter, referred to as Nakai et al.) may be adopted.

Next, it is selected whether the numerical data obtained from the image data is newly registered in the image comparing apparatus 200, or the numerical data is compared with numerical data stored in advance in the feature storing unit 203 (Step S203). The image comparing apparatus according to this embodiment may be realized, for example, by a personal computer or a workstation. The feature extraction unit 202 may indicate the above two options on a display device, so that an option is selected using an input unit such as a keyboard or a mouse, which are not illustrated. When the image comparing apparatus according to this embodiment is incorporated in such as an assortment equipment for forms, instruction inputted by using an input unit outside the assortment equipment such as an operating panel may be transmitted to an apparatus according to the present embodiment via a network, for example.

When the option of registration is selected in Step S203, an index (ID) is newly generated (Step S204). This index may be selected discretionary, unless the same index is registered in advance in the feature storage unit 203. For example, the smallest number of unused numbers may be used. Next, the numerical data obtained in Step S202 as an extracted feature and the index (ID) generated in Step S204 are registered in the feature storage unit 203 (Step S205).

Figure 5:
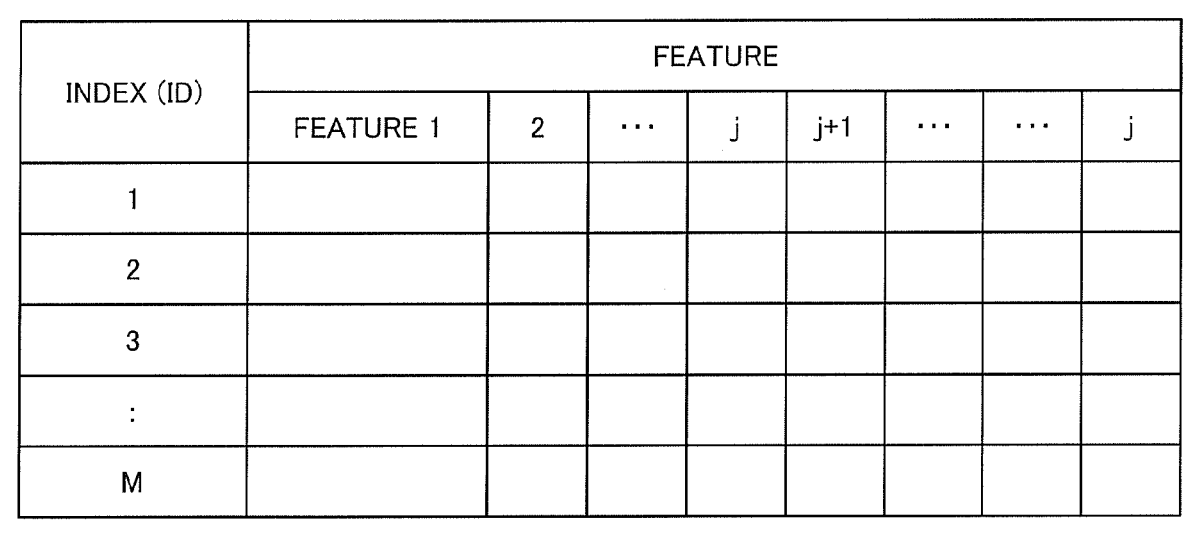

FIG. 5 shows an example of a form of the index (ID) and numerical data stored in the feature storage unit 203. Numerical data is usually dealt with as a vector variable including plural components, not a scalar variable having only one component. Accordingly, in FIG. 5, each of feature items of an image, to which an index is attached, corresponds to each component of the vector. Regarding numerical data, the feature quantities, disclosed in the method described in the above-mentioned Japanese Patent Publication No. 3496559 or Japanese Patent Publication No. 3550681 or the above-mentioned Nakai et al., may be employed as a numerical data. Those feature quantities may be registered simultaneously.

When the option of search is selected in above-mentioned Step S203, numerical data similar to the numerical data obtained from the input image is searched from the plural numerical data registered in advance in the feature storage unit 203 using the numerical data obtained through extraction from the input image in Step S202 (S206).

At first, the numerical data obtained in Step S202 is divided into two parts. Referring to FIG. 5, numerical data having J components is divided into two parts: from 1st to j-th components and from (j+1)-th to J-th components. The dividing position is discretionary. For example, when a numerical data is created according to the above-mentioned Japanese Patent Publication No. 3496559 and according to the above-mentioned Nakai et al., it may be partitioned at a boundary of extracted numerical data through the method described in Japanese Patent Publication No. 3496559 and extracted numerical data through the method described in Nakai et al.

Next, each of the plural numerical data stored in the feature storage unit 203 is divided into two parts at the same dividing position as of the numerical data obtained from the input image. From the components of the numerical data stored in the feature storage unit 203, which belong to the same divided part, numerical data similar to the components of one of the parts (the first part) of the numerical data divided into two parts in the first comparing unit 204 is searched for (Step S206). Since the numerical data is a vector, data similar to the numerical data obtained from the input image is searched for, by selecting a numerical data where a distance or an angle between the vectors is small.

Next, the first comparing unit 204 examines whether there is a numerical data determined to be identical to the numerical data obtained from the input image, in the plural numerical data stored in the feature storage unit 203 (Step S207). In order to find a completely identical numerical data, a distance between the above-mentioned vectors is required to be zero, for example. When an allowable range is permitted, a threshold value is set, for example, and identity is determined based on a result of comparison between the distance and the threshold value. When there is a numerical data determined to be identical in Step S207, the first comparing unit 204 identifies an index (ID) given to the numerical data determined to be identical. The comparison result output unit 206 outputs the identified index (ID) (Step S208). Further, the term "identical" in this specification means a limited case where there is only one numerical data registered in advance in the feature storage unit 203 that is identical to the numerical data obtained from the inputted image. When the numerical data obtained from the input image is identical to plural numerical data registered in advance in the feature storage unit 203, it is not regarded as identical.

On the other hand, in Step S207, when there is no numerical data determined to be identical to the numerical data obtained from the input image in the plural numerical data stored in the feature storage unit 203, the second comparing unit 205 performs comparison. That is, the first comparing unit notifies the second comparing unit 205 of a result that there is no numerical data determined to be identical, and transmits the numerical data obtained from the input image to the second comparing unit 205. The second comparing unit 205 performs a similar comparison processing as the first comparing unit 204 for components of the other part of the two (the second part) of the numerical data divided into two parts (Step S209). Further, in the Step S209, among the plural numerical data stored in the feature storage unit 203, search targets may be limited to numerical data, which have not been determined identical in Step S207, but have distances equal to or smaller than the predetermined threshold value.

Next, the second comparing unit 205 examines whether there is a numerical data determined to be identical to the numerical data obtained from the input image in the plural numerical data stored in the feature storage unit 203 (Step S210). In Step S210, when there is a numerical data determined to be identical, the second comparing unit 205 identifies an index (ID) given to the numerical data determined to be identical. The comparison result output unit 206 outputs the identified index (ID) (Step S208). Criteria of identical may be the same as in Step S207.

On the other hand, in Step S210, when there is no numerical data determined to be identical to the numerical data obtained from the input image in the plural numerical data stored in the feature storage unit 203, the comparison result output unit 206 outputs a result that there are no objects to be identified (Step S211).

According to the embodiment, the numerical data obtained from the input image is divided into two parts as described above. The first comparing unit 204 investigates whether there is a numerical data determined to be identical to one of the divided numerical data in the plural numerical data stored in the feature storage unit 203. When there is a numerical data determined to be identical, the processing for comparing needs not to proceed to the step by the second comparing unit 205. By comparing partially the numerical data obtained from the input image, an index (ID) given to the numerical data determined to be identical is outputted. For this reason, the processing of the image comparing becomes faster.

According to the present embodiment, only numerical data converted from image data is used, and the character recognition is not required. As a result, adverse affect due to an erroneous recognition is excluded. For this reason, the precision of the image comparing is improved.

(The Third Embodiment)

Figure 6:
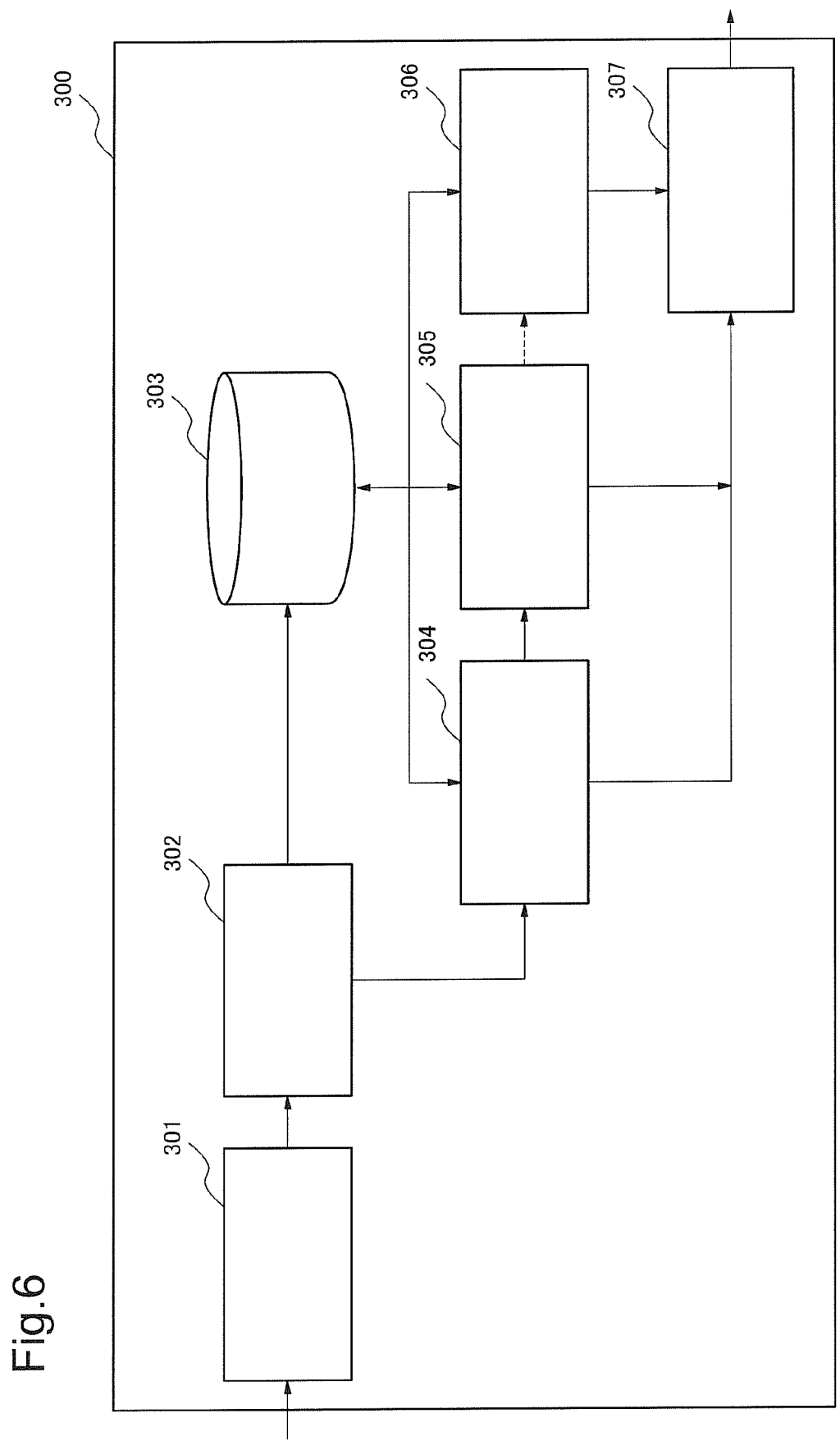
FIG. 6 shows an example of an image comparing apparatus in a third embodiment.

Next, a third embodiment will be described with reference to drawings. FIG. 6 is a block diagram showing an example of an image comparing apparatus of the third embodiment.

As shown in FIG. 6, this embodiment has a feature that three or more comparing units are provided. An image comparing apparatus 300 according to this embodiment includes an image input unit 301, a feature extraction unit 302, a feature storage unit 303, N comparing units (N is an integer larger than 2.) from a first to N-th comparing unit and a comparison result output unit 307. The image input unit 301 scans an image indicated on a sheet and converts the scanned image into image data processible by a computer. The feature extraction unit 302 converts the image data obtained by the image input unit 301 into a numerical data. For example, the image indicated on a sheet includes a postal address. The feature storage unit 303 stores the numerical data corresponding to the above-mentioned image obtained by the feature extraction unit 302 with an index.

The image input unit 301 scans a surface of a sheet indicating a retrieval picture to obtain image data. The obtained image data is converted by the feature extraction unit 302 into a numerical data. Based on this numerical data, numerical data corresponding to the retrieval picture indicated on the sheet is selected from plural numerical data stored in the feature storage unit 303. Then, the numerical data obtained by the feature extraction unit 302 and the numerical data stored in the feature storage unit 203 are divided into N parts, respectively. Based on the divided parts of the numerical data, the N comparing units, from the first comparing unit to N-th comparing units (304 and 305-306 in FIG. 6), select a numerical data most similar to the numerical data obtained by extraction from the input image. The comparison result output unit 307 outputs an index given to the numerical data selected by the N comparing units, from the first comparing unit to N-th comparing unit.

Although an image comparing apparatus according to this embodiment comprises three or more comparing unit, each of the comparing units, from third to N-th, performs the same comparing processing for the numerical data obtained from the input image with numerical data among plural images stored in the feature storage unit 303 as in the first comparing unit 304 and the second comparing unit 305. These N comparing units are realized, for example, by a personal computer or a workstation, which can calculate a similarity of numerical data.

According to the embodiment, the processing in the first comparing unit 304 and the second comparing unit 305 are similar to the processing in the second embodiment. That is, components of a first part of the numerical data divided into N parts are used in the first comparing unit 304, and components of a second part are used in the second comparing unit 305. However, it is discretionary to decide which part of the N parts of the numerical data is used for the components of the first part, or which part is used for the components of the second part.

Figure 7:
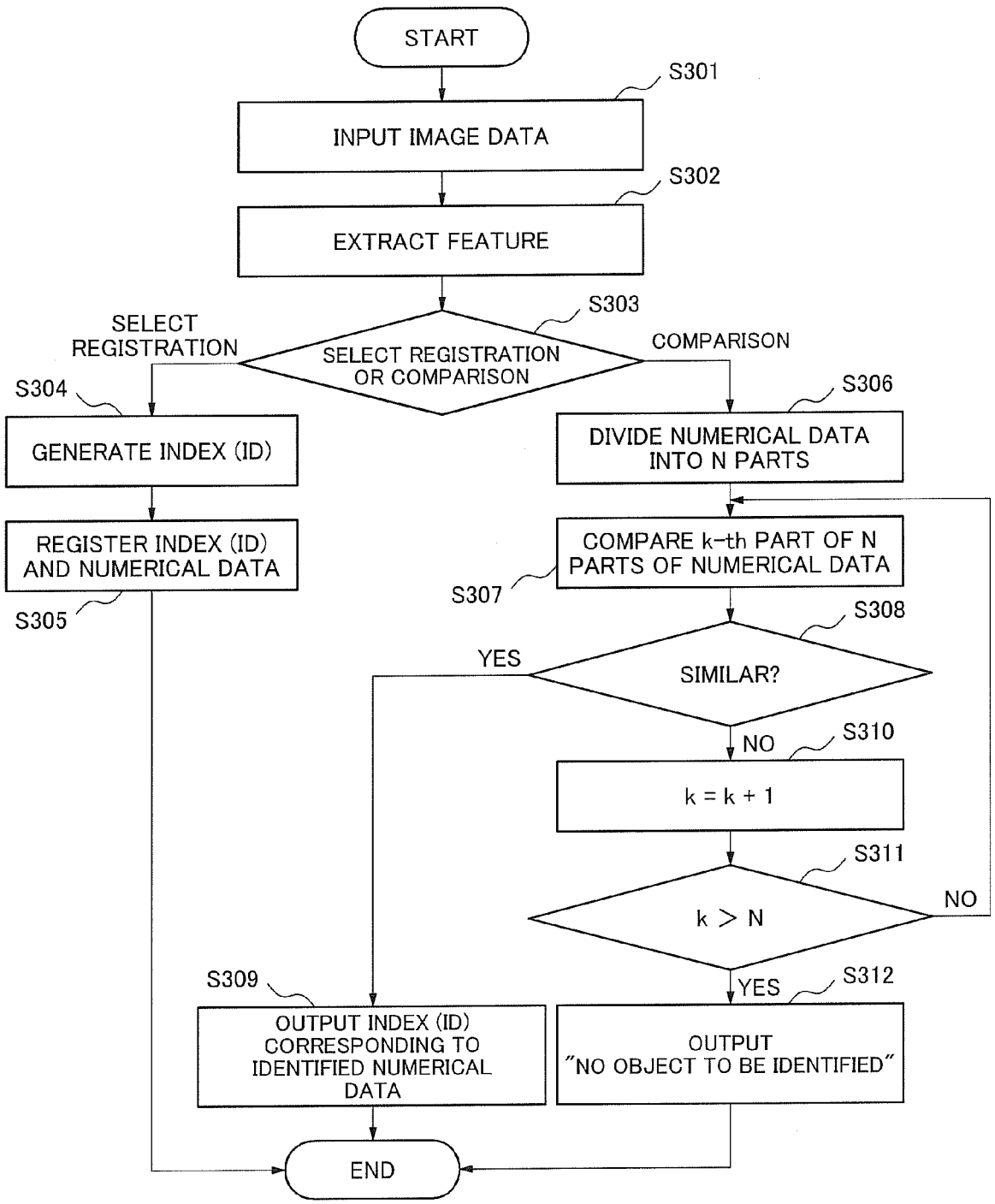
FIG. 7 shows an example of processing of the image comparing apparatus in the third embodiment.

Next, the processing of this embodiment will be described with reference to a flowchart shown in FIG. 7. The image input unit 301 scans a surface of a sheet and obtains data of an image such as a character, a symbol or a figure indicated on a surface of the sheet (Step S301). For example, the image includes a postal address. Next, the feature extraction unit 302 extracts a feature from the inputted image data (Step S302). Specifically, extraction of the feature is conversion from the image data to a numerical data, for example.

When the option of registration is selected in step S303, an index (ID) is newly generated (Step S304). This index may be selected discretionary, unless the same index is registered in advance in the feature storage unit 303. For example, the smallest number of unused numbers may be employed. Next, the numerical data obtained in Step S302 as an extracted feature and the index (ID) generated in Step S304 are registered in the feature storage unit 303 (Step S305).

When the option of search is selected in Step S303, numerical data similar to the numerical data obtained by extracting from the input image in Step S302 is searched from plural numerical data registered in advance in the feature storage unit 303.

At first, a variable k is initialized to 1 and the numerical data obtained from the input image is divided into N parts (Step S306). Next, the k-th comparing unit searches numerical data similar to the numerical data obtained from the input image, from the plural numerical data stored in the feature storage unit 303, using the k-th partial components of the numerical data from the input image divided into N parts, and components of the numerical data stored in the feature storage unit 303 in the same divided part partitioned at the same positions as the division of the numerical data obtained from the input image (Step S307). At this point, because k=1, the k-th comparing unit is the first comparing unit 304. In a search of numerical data similar to the numerical data obtained from the input image, the first comparing unit 304 selects a numerical data, where the distance or the angle between vectors is small.

Next, the first comparing unit 304 examines whether there is a numerical data determined to be identical to the numerical data obtained from the input image in the plural numerical data stored in the feature storage unit 303 (Step S308). If a completely identical numerical data is required, a numerical data may be selected, where a distance between the above-mentioned vectors is zero, for example. When an allowable range is permitted, a threshold value may be set, for example, so that the identity is determined based on a result of comparison between the distance and the threshold value. When there is a numerical data determined to be identical in Step S307, the first comparing unit 304 identifies an index (ID) given to the numerical data determined to be identical. The comparison result output unit 307 outputs the identified index (ID) (Step S309).

On the other hand, in Step S308, when there is no numerical data determined to be identical to the numerical data obtained from the input image in the plural numerical data stored in the feature storage unit 303, the variable k is incremented by 1 (Step S310). Next, it is determined whether the incremented variable k is larger than N (Step S311). When the variable k is N or less, among the components of the numerical data divided into N parts, components belonging to a part exist, which has not been compared yet. Next, the k-th comparing unit (at this point, k=2, therefore, the second comparing unit 305), searches numerical data similar to the numerical data obtained from the input image from the plural numerical data stored in the feature storage unit 303, using the k-th (at this point, the second) partial components of the numerical data from the input image divided into N parts, and components of the numerical data stored in the feature storage unit 303 in the same divided part partitioned at the same positions as the division of the numerical data obtained from the input image (Step S307).

Further, in the Step S308, among the plural numerical data stored in the feature storage unit 303, search targets may be limited to those numerical data, which have not been determined identical in Step S307, but have distances equal to or smaller than the predetermined threshold value.

Next, the second comparing unit 305 examines whether there is a numerical data determined to be identical to the numerical data obtained from the input image in the plural numerical data stored in the feature storage unit 303 (Step S308). In Step S308, when there is a numerical data determined to be identical, the second comparing unit 305 identifies an index (ID) given to the numerical data determined to be identical. The comparison result output unit 307 outputs the identified index (ID) (Step S309). Criteria of identical may be the same as in the first comparing unit 304.

On the other hand, in Step S308, when there is no numerical data determined to be identical to the numerical data obtained from the input image in the plural numerical data stored in the feature storage unit 303, the processing of Steps S310, S311, S307 and S308 is repeated as above until a determination result indicating identical is obtained in Step S308. In the comparing unit from third to N-th, using from the third to k-th partial components of the numerical data divided into N, the comparison processing with the plural numerical data stored in the feature storage unit 303 is continued. In this processing, one of the comparing unit, when a determination result of identical is obtained in Step S308, identifies an index (ID) given to the numerical data determined to be identical. The comparison result output unit 307 outputs the identified index (ID) (Step S309). Then, the processing ends.

However, when a determination result of identical is not obtained in Step S308, and the N-th comparing unit 306 determines that there is no numerical data, in which components in the n-th part are identical, in the plural numerical data stored in the feature storage unit 303, it is determined that k is larger than N, in Step S311. None of the numerical data divided into N parts is identical to the numerical data stored in the feature storage unit 303. The comparison result output unit 307 outputs a result that there are no objects to be identified (Step S312).

Further, in the Step S308, among the plural numerical data stored in the feature storage unit 303, search targets may be limited to those numerical data which have not been determined to be identical, but have distances equal to or smaller than the predetermined threshold value. In this embodiment, the same effect as in the second embodiment is also obtained.

(The Fourth Embodiment)

Figure 8:
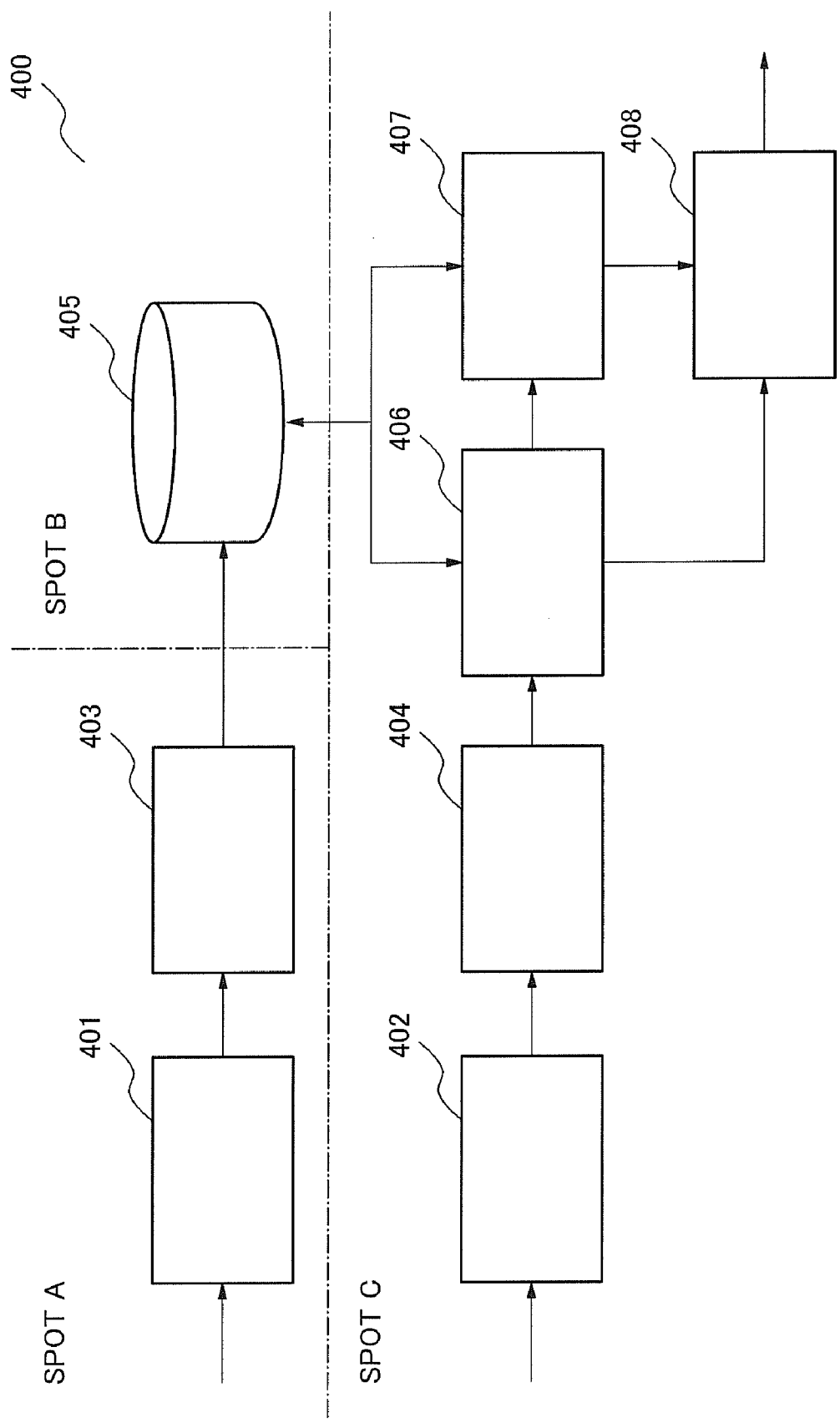
FIG. 8 indicates an example of an image comparing apparatus in a fourth embodiment.

Next, a fourth embodiment of the present invention will be explained with reference to drawings. FIG. 8 is a block diagram showing an example of an image comparing apparatus of the fourth embodiment. As shown in FIG. 8, an image comparing apparatus according to this embodiment includes a first image input unit 401, a second image input unit 402, a first feature extraction unit 403, a second feature extraction unit 404, a feature storage unit 405, a first comparing unit 406, a second comparing unit 407 and a comparison result output unit 408.

The first image input unit 401 and the second image input unit 402 scan an image such as a character, a symbol or a figure indicated on a sheet, respectively, and convert the scanned images into an image data processible by a computer. The first and second image input unit 401 and 402 are scanners equipped with function of photoelectric conversion, for example. For example, the image includes a postal address. The first feature extraction unit 403 and the second feature extraction unit 404 convert the image data outputted from the first image input unit 401 and the second image input unit 402, respectively, into the first numerical data and the second numerical data. For example, the first and second feature extraction unit 403 and 404 are realized by a personal computer or a workstation. Connection between the image input unit 401 and the feature extraction unit 403, and connection between the second image input unit 402 and the second feature extraction unit 404 are realized by a common transmission cable such as a USB cable, IEEE1394 cable or Ethernet® cable, or by wireless communication. The feature storage unit 405 stores a first numerical data corresponding to the image obtained by the first feature extraction unit 403 with an index.

The second image input unit 402 scans a surface of a sheet indicating a retrieval picture to obtain image data. The obtained image data is converted by the second feature extraction unit 404 into a second numerical data. The first comparing unit 406, based on the second numerical data, selects a numerical data corresponding to the image indicated on the sheet among plural first numerical data stored in the feature storage unit 405. Then, the first comparing unit 406 selects a numerical data having a part most similar to a first predetermined part of the numerical data obtained by extracting from the inputted retrieval picture in the second feature extraction unit 404, from the plural numerical data stored in the feature storage unit 405. An index given to the selected numerical data is identified.

When no numerical data determined to be identical is obtained by the first comparing unit 406, the second comparing unit 407 selects a numerical data most similar to the numerical data obtained from the input image, using a second partial numerical data other than the first predetermined part used by the first comparing unit 406. The comparison result output unit 408 outputs the index identified by the first comparing unit 406 or the second comparing unit 407.

In this embodiment, when registering or searching an image, it is selected whether the first image input unit 401 and the first feature extraction unit 403 are used or the second image input unit 402 and the second feature extraction unit 404 are used. The processing other than this operation is the same as the processing in the second embodiment shown in the flowchart of FIG. 4.

In this embodiment, the first image input unit 401 and the first feature extraction unit 403 are installed in a spot A and the second image input unit 402 and the second feature extraction unit 404 are installed in a spot B, for example. Image data are inputted from sheets at locations of different spots, and the images are compared at a distant place. For example, a medium of the sheet, from which an image has been registered at the spot A, is carried from the spot A to the spot B by means of transportation, and the image is searched for at the spot B. The feature storage unit 405 may be installed in a location, a spot C, other than the spot A or the spot B. Data communication is needed between these spots, and it is realized by an existing communication unit such as the internet.

(The Fifth Embodiment)

Figure 9:
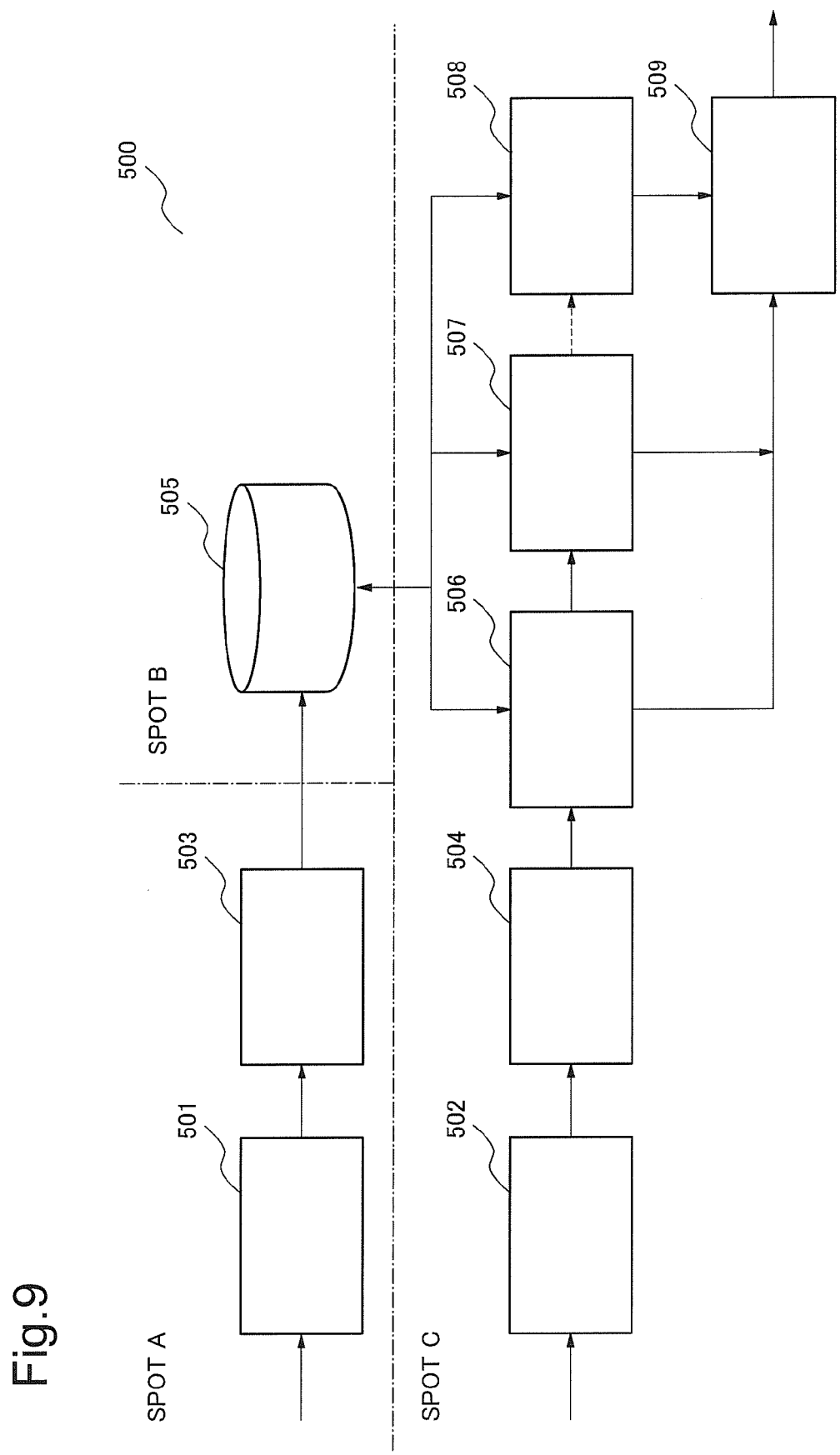
FIG. 9 indicates an example of an image comparing apparatus in a fifth embodiment.

Next, a fifth embodiment will be described. FIG. 9 is a block diagram showing an example of an image comparing apparatus of the fifth embodiment. An image comparing apparatus according to the fifth embodiment includes a first image input unit 501, a second image input unit 502, a first feature extraction unit 503, a second feature extraction unit 504, a feature storage unit 505, N comparing units, from 506 to 508, and a comparison result output unit 509.

Each of the N comparing units from 506 to 508 selects a numerical data corresponding to the image indicated on the sheet among first numerical data obtained by the first feature extraction unit 503 and stored in the feature storage unit 505, based on a second numerical data obtained by the second feature extraction unit 504. Then, the second numerical data obtained by the second feature extraction unit 504 and each of the first numerical data stored in the feature storage unit 505 are divided into N parts, respectively. Each of the comparing units from the first to N-th 506-508 identifies an index corresponding to the most similar numerical data to each part of the divided numerical data. The comparison result output unit 509 outputs the index identified by these N comparing units from the first comparing unit 506 to the N-th comparing unit 508.

In this embodiment, it is selectable whether the first image input unit 501 and the first feature extraction unit 503 are used or the second image input unit 502 and the second feature extraction unit 504 are used. Other processing of this embodiment is the same as the processing of the second embodiment shown in the flowchart of FIG. 7.

In this embodiment, the first image input unit 501 and the first feature extraction unit 503 are installed in the spot A and the second image input unit 502 and the second feature extraction unit 504 are installed in the spot B, for example. Image data is inputted from the sheet at a location of the different spots, and an image is compared at a distant place. For example, a medium of the sheet for which an image has been registered at the spot A is moved from the spot A to the spot B by means of transportation, and the image is searched for at the spot B. The feature storage unit 505 may be installed in a location, a spot C, other than the spot A or the spot B. Data communication is needed between the spots, and it is realized by an existing communication unit such as the internet.

Meanwhile, the present invention is not limited to the above mentioned embodiments, and thus a program which realizes processing of the first to fifth embodiment on a computer is included therein.

Figure 10:
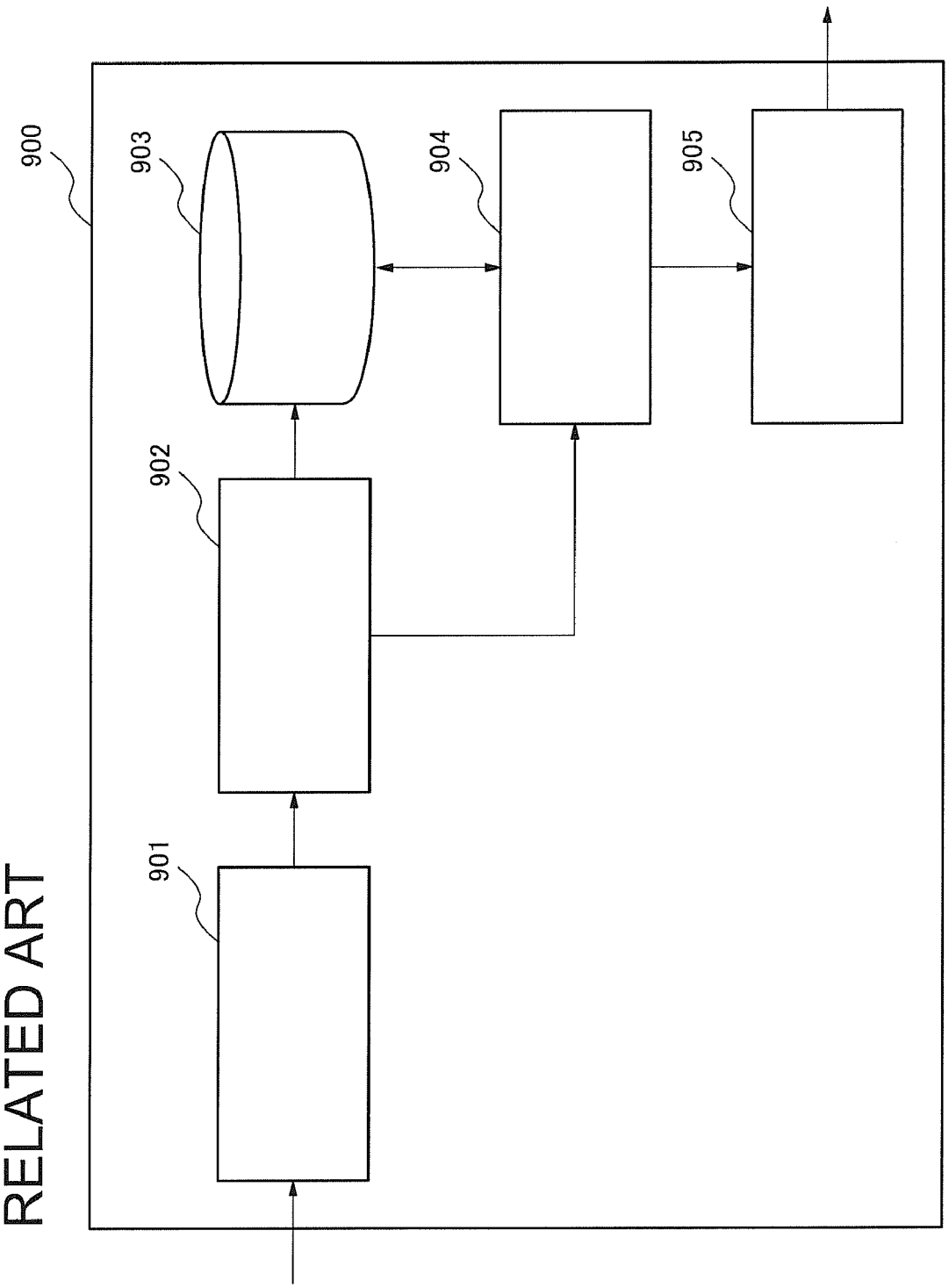
FIG. 10 is a block diagram of an example of an image comparing apparatus in the related art.
Figure 11:
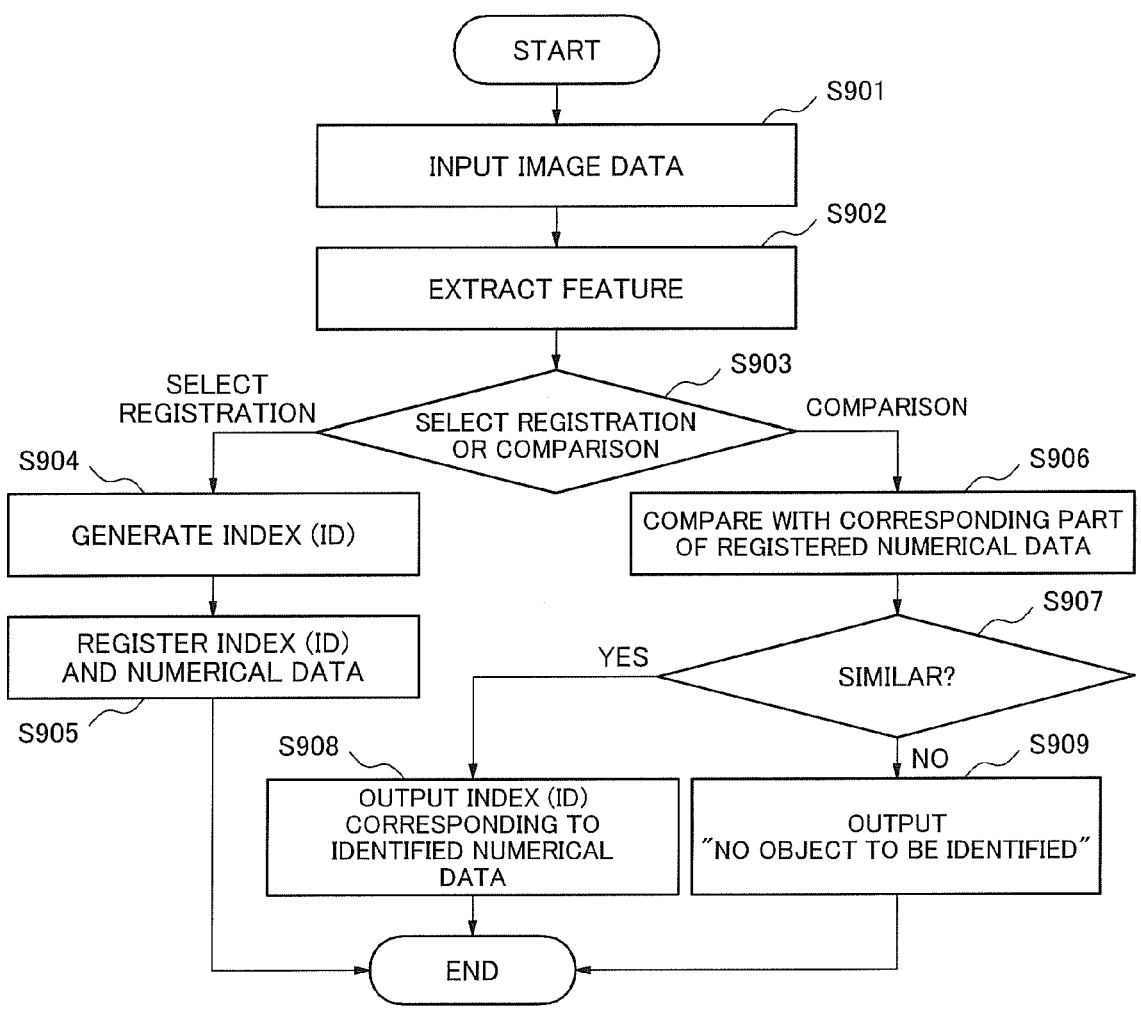
FIG. 11 is a flowchart showing an example of processing of the image comparing apparatus in the related art.

The image comparing apparatus 900 shown in FIG. 10 of the related art performs comparing processing using whole numerical data extracted from an image with single comparing unit 104. For this reason, computational complexity is increased and as a result, there is a problem that comparing processing is slow.

An image comparing apparatus disclosed in Japanese Patent Application Laid-Open No. 2000-011088 or Republication of PCT international application WO2002/029720 performs comparing processing using image information taken in, but not numerical data. For this reason, when a whole image is not recognized properly in a mail image recognition result or a fingerprint image recognition result, there is a problem that wrong comparison occurs.

An image comparing apparatus according to the embodiments of the present invention substitutes for a bar code reader in a foreign mail classification system or in a physical distribution system. A conventional barcode reading system reads a barcode which is printed on a mail or a delivered article delivered by a physical distribution system, and acquires address data or delivery destination data from the reading value (ID) to sort the mail or the delivered article into a sorting box corresponding to the respective addresses in the delivery service area. In contrast, an image comparing apparatus according to the embodiments of the present invention is used for a system to identify a postal mail or a delivered article based on numerical data which is obtained from an image acquired by scanning the surface of the postal mail or the delivered article itself.

An exemplary advantage according to the invention is that by providing plural comparing units and performing comparison using divided numerical data only, image comparison is performed with high accuracy and at high speed.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. An image comparing method for comparing a plurality of first images and a second image, comprising:
    converting, by a processor of a computing device, said second image to generate a second numerical data;
    dividing, by the processor each of a plurality of first numerical data corresponding to said plurality of first images into a plurality of parts, and dividing said second numerical data into a plurality of parts;
    comparing, by the processor a first part of the divided parts of said plurality of first numerical data and a first part of the divided parts of said second numerical data;
    outputting, by the processor a first result, when said first part of the divided parts of said plurality of first numerical data satisfies a first condition; and
    comparing, by the processor a second part of the divided parts of said plurality of first numerical data and a second part of the divided parts of said second numerical data, when the first part of the divided parts of said plurality of first numerical data does not satisfy said first condition.

2. The image comparing method according to claim 1, wherein
said first condition includes detecting that the first part of the divided parts of said second numerical data is similar to at least one of the first parts of the divided parts of said first numerical data.

3. The image comparing method according to claim 1, wherein
each of said plurality of first numerical data is associated with an index, and
said first result includes an index of said first numerical data including a first part of the divided parts, which is similar to the first part of the divided parts of said second numerical data.

4. The image comparing method according to claim 1, further comprising:
outputting a second result, when the second part of the divided parts of said plurality of first numerical data satisfies a third condition.

5. The image comparing method according to claim 4, further comprising:
comparing a third part of the divided parts of said plurality of first numerical data and a third part of the divided parts of said second numerical data, when the second part of the divided parts of said plurality of first numerical data satisfies a fourth condition.

6. The image comparing method according to claim 5, wherein each of the plurality of first numerical data is divided into N parts, and the second numerical data is divided into N parts, N being an integer larger than 3, further comprising:
outputting the second result, when an i-th part of the divided parts of said plurality of first numerical data satisfies the third condition, i being an integer larger than 2 and less than N;
comparing an (i+1)-th part of the divided parts of the plurality of first numerical data and an (i+1)-th part of the divided parts of the second numerical data, when the i-th part of the divided parts of the plurality of first numerical data satisfies the fourth condition; and
outputting a third result, when an N-th part of the divided parts of the plurality of first numerical data satisfies the fourth condition.

7. The image comparing method according to claim 4, further comprising:
outputting a third result, when the second part of the divided parts of said plurality of first numerical data satisfies a fourth condition.

8. The image comparing method according to claim 4, wherein
said third condition includes detecting that the part of the divided parts of said second numerical data is similar to at least one of the parts of the divided parts of said first numerical data, which is compared with the part of the divided parts of said second numerical data.

9. The image comparing method according to claim 8, wherein
the fourth condition includes determining that the part of the divided parts of said second numerical data is dissimilar to the part of the divided parts of said first numerical data, which is compared with the part of the divided parts of said second numerical data.

10. The image comparing method according to claim 8, wherein
said second result includes an index of said first numerical data including a part of the divided parts, which is similar to the part of the divided parts of said second numerical data, which is compared with the part of the divided parts of said first numerical data.

11. The image comparing method according to claim 1, further comprising:
converting said first image and generating first numerical data corresponding to said first image; and
appending an index to said first numerical data.

12. An image comparing apparatus, for comparing a plurality of first images and a second image, comprising:
a generating unit to convert said second image to generate a second numerical data;
a dividing unit to divide each of a plurality of first numerical data corresponding to said plurality of first images into a plurality of parts, and divide said second numerical data into a plurality of parts; and
a comparing unit to compare a first part of the divided parts of said plurality of first numerical data and a first part of the divided parts of said second numerical data,
to output a first result, when said first part of the divided parts of said plurality of first numerical data satisfies a first condition, and
to compare a second part of the divided parts of said plurality of first numerical data and a second part of the divided parts of said second numerical data, when the first part of the divided parts of said plurality of first numerical data does not satisfy said first condition.

13. The image comparing apparatus according to claim 12, wherein
said first condition includes detecting that the first part of the divided parts of said second numerical data is similar to at least one of the first parts of the divided parts of said first numerical data.

14. The image comparing apparatus according to claim 12, wherein
each of said plurality of first numerical data is associated with an index, and
said first result includes an index of said first numerical data including a first part of the divided parts, which is similar to the first part of the divided parts of said second numerical data.

15. The image comparing apparatus according to claim 12, wherein
said comparing unit outputs a second result, when the second part of the divided parts of said plurality of first numerical data satisfies a third condition.

16. The image comparing apparatus according to claim 15, wherein
said comparing unit compares a third part of the divided parts of said plurality of first numerical data and a third part of the divided parts of said second numerical data, when the second part of the divided parts of said plurality of first numerical data satisfies a fourth condition.

17. The image comparing apparatus according to claim 16, wherein
each of the plurality of first numerical data is divided into N parts, and the second numerical data is divided into N parts, N being an integer larger than 3,
said comparing unit outputs the second result, when an i-th part of the divided parts of said plurality of first numerical data satisfies the third condition, i being an integer larger than 2 and less than N,
compares an (i+1)-th part of the divided parts of the plurality of first numerical data and an (i+1)-th part of the divided parts of the second numerical data, when the i-th part of the divided parts of the plurality of first numerical data satisfies the fourth condition, and outputs a third result, when an N-th part of the divided parts of the plurality of first numerical data satisfies the fourth condition.

18. The image comparing apparatus according to claim 15, wherein
said comparing unit outputs a third result, when the second part of the divided parts of said plurality of first numerical data satisfies a fourth condition.

19. The image comparing apparatus according to claim 15, wherein
said third condition includes detecting that the part of the divided parts of said second numerical data is similar to at least one of the parts of the divided parts of said first numerical data, which is compared with the part of the divided parts of said second numerical data.

20. The image comparing apparatus according to claim 19, wherein
the fourth condition includes determining that the part of the divided parts of said second numerical data is dissimilar to the part of the divided parts of said first numerical data, which is compared with the part of the divided parts of said second numerical data.

21. The image comparing apparatus according to claim 19, wherein
said second result includes an index of said first numerical data including a part of the divided parts, which is similar to the part of the divided parts of said second numerical data, which is compared with the part of the divided parts of said first numerical data.

22. The image comparing apparatus according to claim 12, wherein
said generating unit converts said first image and generating first numerical data corresponding to said first image, and appends an index to said first numerical data.

23. A non-transitory recording medium, in which a program which makes a computer execute processing to compare a plurality of first images and a second image is stored, the processing comprising:
converting said second image to generate a second numerical data;
dividing each of a plurality of first numerical data corresponding to said plurality of first images into a plurality of parts, and dividing said second numerical data into a plurality of parts;
comparing a first part of the divided parts of said plurality of first numerical data and a first part of the divided parts of said second numerical data;
outputting a first result, when said first part of the divided parts of said plurality of first numerical data satisfies a first condition; and
comparing a second part of the divided parts of said plurality of first numerical data and a second part of the divided parts of said second numerical data, when the first part of the divided parts of said plurality of first numerical data does not satisfy said first condition.

* * * * *